Dec. 24, 1968  W. RICHTER  3,417,596
DRAW DIES AND PULL THROUGH FEEDER
SYSTEM THEREFOR
Filed Oct. 12, 1965   5 Sheets-Sheet 1
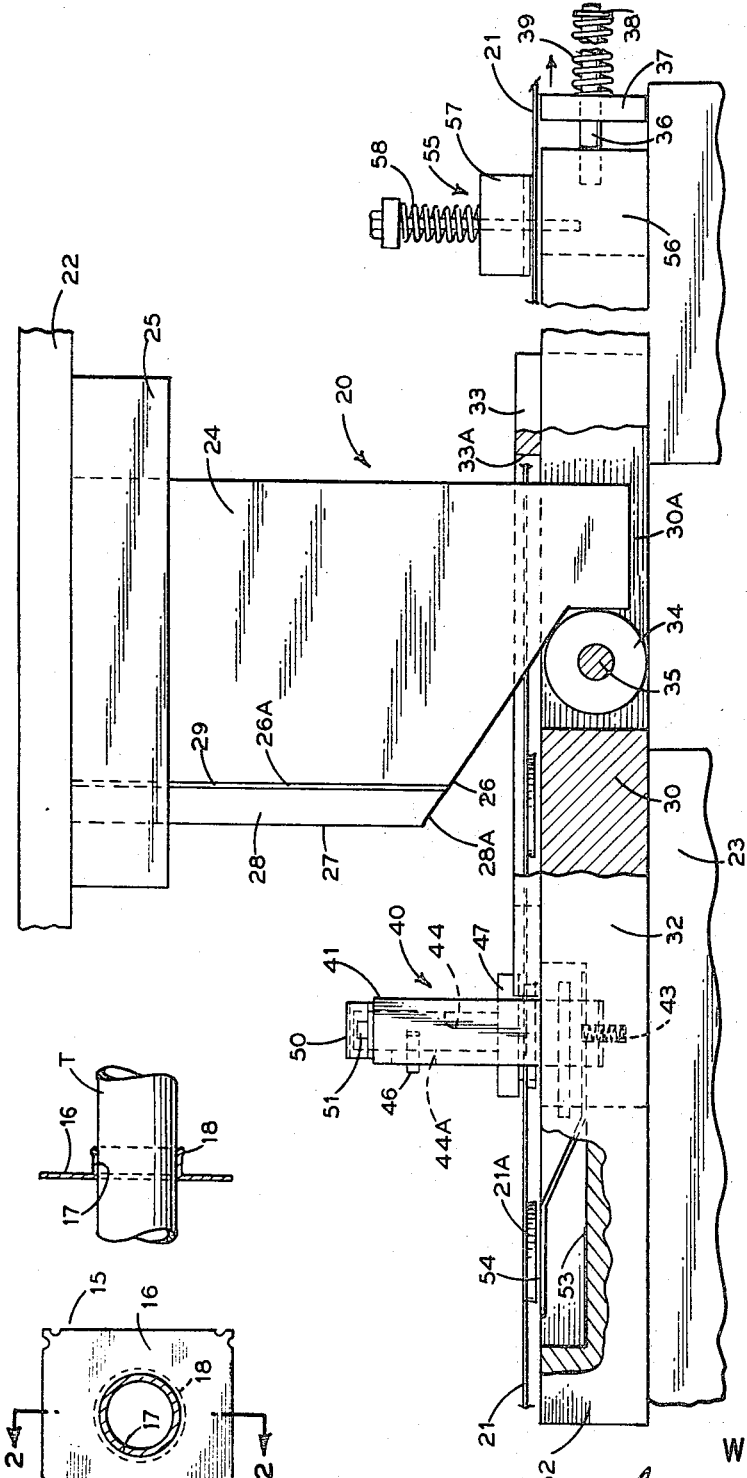
INVENTOR.
Walter Richter
BY
ATTORNEY

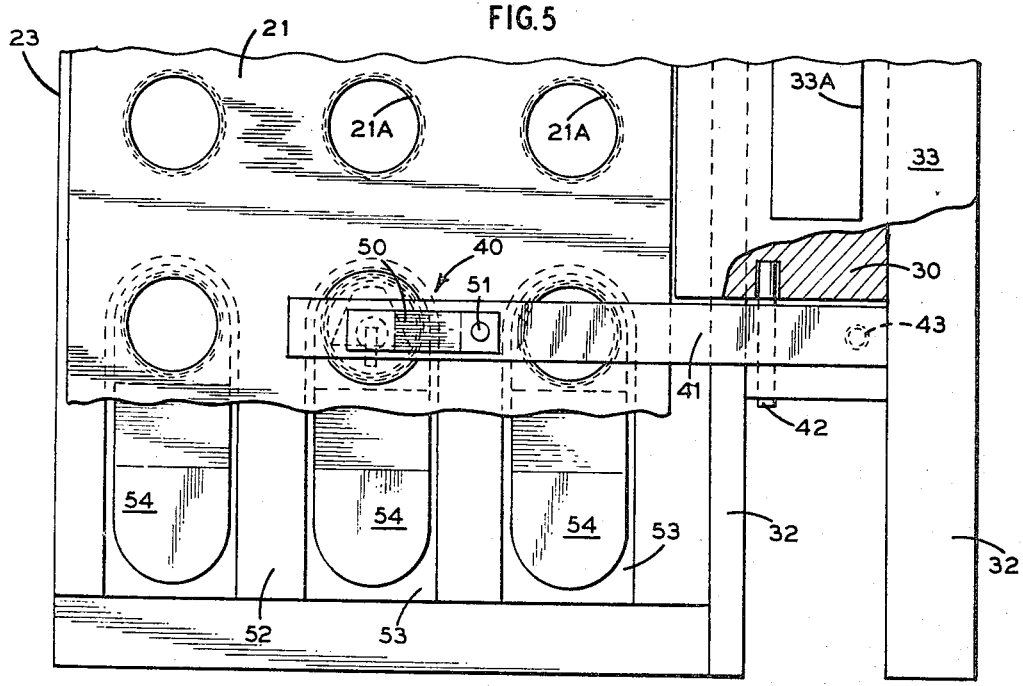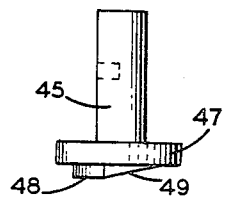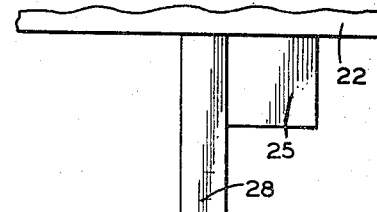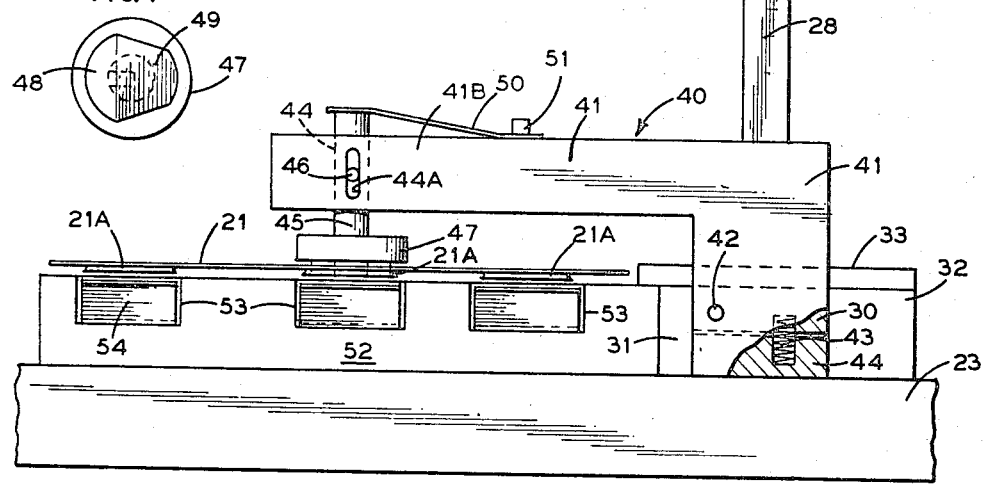

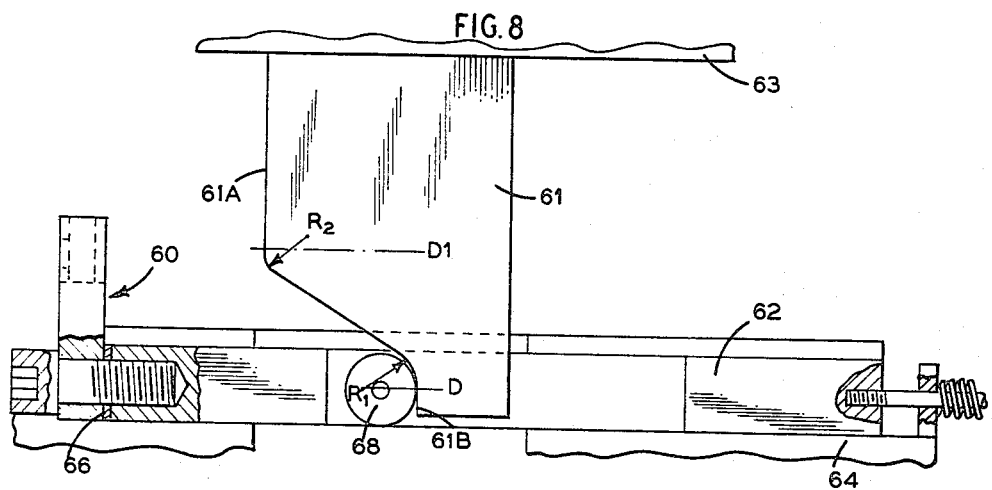
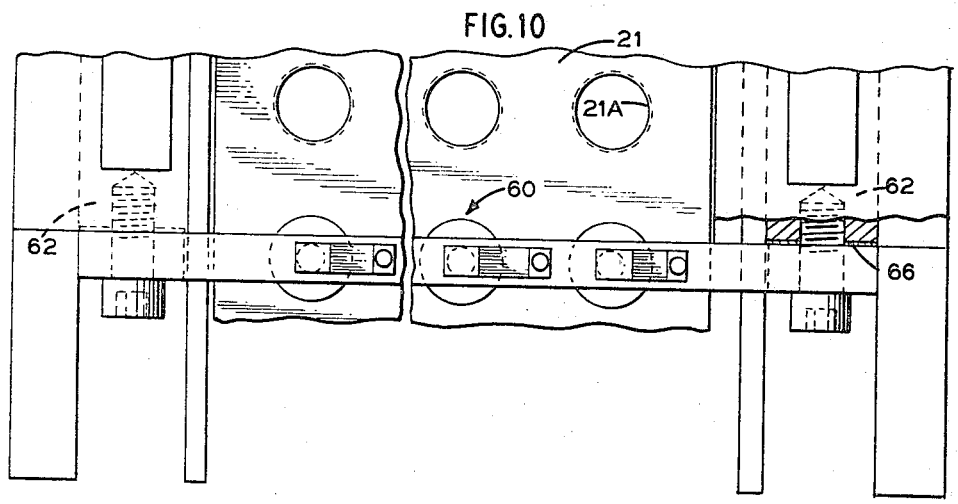
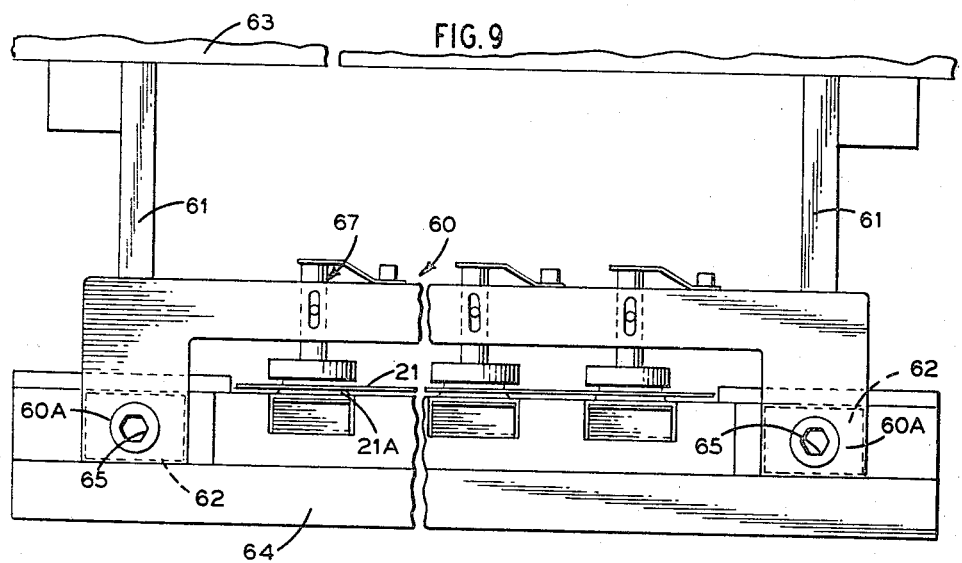

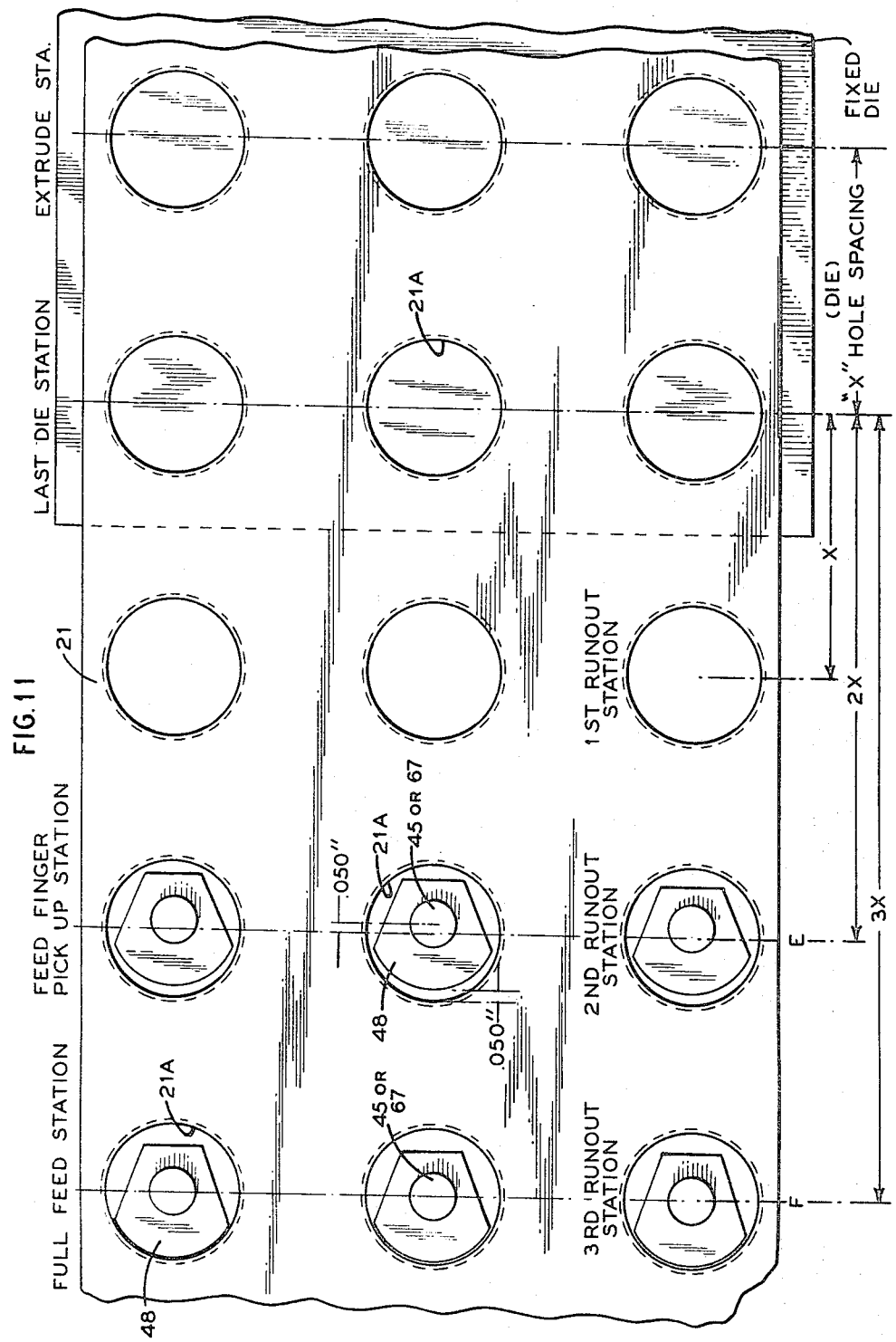

3,417,596
DRAW DIES AND PULL THROUGH FEEDER SYSTEM THEREFOR

Walter Richter, Syosset, N.Y., assignor to Hudson Machine & Tool Corporation, Farmingdale, N.Y., a corporation of New York
Filed Oct. 12, 1965, Ser. No. 495,178
17 Claims. (Cl. 72—361)

ABSTRACT OF THE DISCLOSURE

This disclosure is directed to a die set comprising a pair of relatively movable die members and having incorporated therewith a pull-through feed system in which the material to be worked on is advanced in a rectilinear manner a predetermined amount as the die set closes to form the work material disposed therebetween.

---

This invention relates in general to a draw die with pull through feeder die system, and more specifically to a pull through die system utilized in conjunction with a pair of complementary drawing dies for forming sheet material with collared holes.

In industry it is frequently desirable to form relatively thin sheet material, as for example, sheet aluminum, copper and the like with collared holes. An application of such sheet material having collared holes is in the manufacture of fins for use as radiating surfaces in a baseboard radiation unit or the like. An example of such radiation unit is disclosed in U.S. Letters Patent 2,963,276.

The basic problem noted in forming collared holes in relatively thin material is that of feeding thin and usually soft material such as aluminum or the like through a progressive die set. In such forming operations, it is essential that thin sheet material be moved a predetermined fixed amount on each stroke of the press to properly advance the material through the progressive stations of the dies so that the forming taking place at any one station will be in near perfect registry with the forming occurring in any preceding station or stations. In high speed operation, e.g. 400 strokes per minute, the problem of maintaining the precise constant feed increments of the material through the die set becomes even more aggravated. Consequently, the feeding of relatively thin materials through the respective stations of a progressive die has caused considerable concern to those persons skilled in the industry.

In the present technology there are in general use three general systems of feeding such materials through a set of progressive die. One of the known generally used systems is the roller type push feeder system in which the material to be fed is pinched between a pair of complementary rollers and the material is pushed therethrough to the dies by intermittent rotation of the rollers. The intermittent drive of the rollers is effected by actuating linkages interconnected between the crankshaft of the press and the roller feed mechanism. However, due to variations in roller pinch and slippage, the system must of necessity be set to underfeed. As a result, pilots are required to be built into the dies to effect movement of the material into its final position between the die sets. Accordingly, such roller feed systems are difficult to properly set initially, and require constant adjustment in use. Also such roller type push feeders are particularly sensitive to the material lubrication and material temper. For this reason it is extremely difficult to attain speeds above 200 strokes per minute with such roller type push feeders.

Another feeder heretofore used was a linear type push feeder. These feeders operate on a reciprocating principle in which the material to be fed is intermittently clamped to and then unclamped from the reciprocating system and pushed through the dies a fixed distance by the reciprocating motion. The reciprocating motion in turn is derived from a crankshaft of the press by a mechanical linkage or by separate distinct pistons and cylinders actuated by electric valves electrically timed from the crankshaft rotation. However, it has been noted that these systems are extremely sensitive to material lubrication and are likeiwse required to bet set to underfeed. Accordingly, the material is required to be moved into final position between the respective die plates of the die set by pilots which are built into the die. Thus, the largest known system of this type available is limited to material having a width of less than 8". With this type of system, it is also difficult, if not impossible, to attain more than 200 strokes per minute.

Another known feed system is the linear pull type feeder which operates on a reciprocating principle in which the feed fingers engage collared holes formed in the material by the dies and they pull the material through the dies by a reciprocating motion applied to the feeding finger through a motion derived by mechanical linkages from the crankshaft of the press. These feeders have an advantage over either the roll type push feeder or the linear type push feeders in that the linear pull feeders are positive and consequently do not require the dies to have pilots. Also the linear pull feeders are not subjected to material temperature or material lubrication problems, and consequently are capable of achieving 400 strokes per minute.

In the operation of any feeding system in which pilots are not required in the dies, a precise increments of movement with tolerances of no more than ±.0001" is required. Thus in twenty moves the cumulative tolerance would be ±.0002", which in many fields of endeavor, as for example fin work, would be acceptable.

However, such feed accuracies are very difficult to attain in all feeders where the motion thereof is derived from the crankshaft rotation of the press. This is because such feeders require a multiplicity of linkages with attendant joints or pivots which must rotate or translate with respect to one another, and therefore they cannot be manufactured without providing for assembly clearances and tolerances. While design and construction can minimize the effects of these clearances in setting the feeder to a precise feed length, any change in speed or in feed length requires resetting of the feeder. For high speed operation, the linkages to the crankshaft of the press must be long, often times exceeding 6 feet or more. Such lengths result in crank whip in the linkage which will adversely effect the accuracy of feed since the deflection of such linkages shortens the static length between the link pins. As this effect is a function of speed, it is a major factor in feed adjustment.

It is therefore an object of this invention to provide a novel pull through feeder die system which can be formed as an integral part of a die set.

Another object of this invention is to provide a die set with a pull through feeder system in which the material to be formed is moved through the die set at precise predetermined amounts on each stroke of the press so that the forming taking place at any die station will be in absolute registry with the forming occurring in any other preceding station of the die set.

It is another object of this invention to provide a novel pull through feeder system wherein the motion is obtained from a source other than the crank shaft rotation of the press, and thereby eliminates the multiple linkages heretofore required to produce a comparable feed action.

Another object of this invention is to provide a novel pull through feeder system for draw dies which is insensitive to material lubrication or material temper.

It is another object of this invention to provide a pull through feed system of relatively low mass so as to minimize problems of feed mass acceleration and deceleration.

It is another object of this invention to provide a novel pull through feeder die system which can be built to accommodate any desired stock size without substantially increasing the feeder complexity.

Another object of this invention is to provide a novel feeder die system in which the moving parts are reduced to an absolute minimum and thereby minimize or reduce the number of parts subjected to wear.

Another object of this invention is to provide a novel pull through feeder which can be simply and rapidly adjusted for attaining absolute feed length.

Another object of this invention is to provide a pull through feeder for shock free feeding.

Another object of this invention is to provide an improved pull through feeder for use in conjunction with a progressive die set capable of forming collar holes wherein the holes formed are used at pull points without distorting the holes.

Another object of this invention is to provide an improved pull through die feeder having absolute hole pick-up registry so as to eliminate any possibility of misfeeds.

Another object of this invention is to provide an improved pull through feeder in which the feed increment is substantially enhanced in proportion to the stroke increment of the die set.

In accordance with this invention the foregoing objects, and other features and advantages are attained by a die set having a built in pull through feed system comprising a feeder means including a feeder drive bar movably mounted alongside the fixed die plate. Connected to the movable die plate is an actuator in the form of a cam having an inclined surface disposed in rolling engagement with a cam follower or roller rotatably journalled on the drive feed bar. The arrangement is such that as the movable die is moved toward the fixed die, the cam actuator engaging the cam follower causes the feed drive bar to be rectilinearly displaced a precise predetermined amount. A pull means is connected to the feed drive bar to operatively engage the material to be formed so that the material is advanced or pulled through the die set an amount corresponding to the rectilinear displacement of the feed drive bar. To assure that only that amount of material enters the die set that corresponds to the rectilinear displacement of the feed drive bar, a brake means is arranged to exert a constant braking force on the material as it is being pulled through the die. Accordingly, on each stroke of the press, the cam effects a linear displacement depending on the angle of inclination of the cam means with respect to the horizontal. A resilient means operating on the feeder drive bar exerts a bias thereon to maintain the inclined surface of the cam in rolling engagement with the cam follower. On the upward movement of the stroke, the resilient means operating on the feeder drive bar will bias or return the feed drive bar towards its inoperative position.

Accordingly, the pull means is constructed to release the material being pulled on the return stroke of the feed drive bar so that on the next succeeding stroke of the press, the pull means is again placed in engagement with the material to advance the material a corresponding predetermined amount.

In a modified form of the invention, the ratio of feed stroke to die stroke can be enhanced so that a greater feed increment is attainable without increasing the die stroke. This is attained by minimizing the angle of inclination of the cam means with respect to the horizontal, and by the incorporation of anti-friction means on the feeder drive bar and cam follower to minimize friction.

A feature of this invention resides in providing a multi-stationed drawing die with a pull through feeder system whereby the materials to be drawn are precisely advanced from station to station predetermined amounts so that the forming taking place at any one station will be in perfect registration with the forming occurring in any of the other preceding stations.

Another feature of this invention resides in the provision of drawing dies having a pull through feeder system in which pilots are not required to place the material in final registration with the forming station of the dies.

Another feature of this invention resides in means for feeding the material to drawing dies wherein the movement of the material through the dies is attained by the movement of the movable die member of the die set.

Another feature of this invention resides in the precision and accuracy with which material is moved through a die set.

Another feature of this invention resides in a die construction and feeder therefore which is insensitive to material temper variation.

Another feature of this invention resides in the provision of a die construction and feeder means therefore which is insensitive to stock lubrication and/or excess lubrication.

Another feature of this invention resides in a die construction and feeder means therefore which will not jam.

Another feature of this invention resides in a feed system for a die set which allows splicing of the end of a finish coil to the beginning or starting end of a new coil of material and thereby eliminate the threading operation hereto required for each new coil.

Another feature of this invention resides in a die construction and means for feeding stock material therethrough in which the number of strokes or feed rate is substantially enhanced.

Other features and variations will become more readily apparent when considered in view of the description and drawings in which, FIGURE 1 is a front view of a fin construction adapted to be formed by the die system of the present invention.

FIGURE 2 illustrates a sectional view taken along line 2—2 of FIG. 1.

FIGURE 3 is a fragmentary elevational view of a die system having parts thereof shown in section.

FIGURE 4 is an end view of the die structure and feeder means of FIGURE 3.

FIGURE 5 is a partial plan view of FIG. 4.

FIGURE 6 is a detail side view of the feed finger.

FIGURE 7 is a bottom plan view of the feed finger of FIG. 6.

FIGURE 8 is a vertical section view similar to that of FIG. 3, but illustrating a modified form of the invention.

FIGURE 9 is an end view of the invention disclosed in FIG. 8.

FIGURE 10 is a plan view of FIG. 7.

FIGURE 11 is a plan view of the stock material as it is fed through the die.

Figure 12:
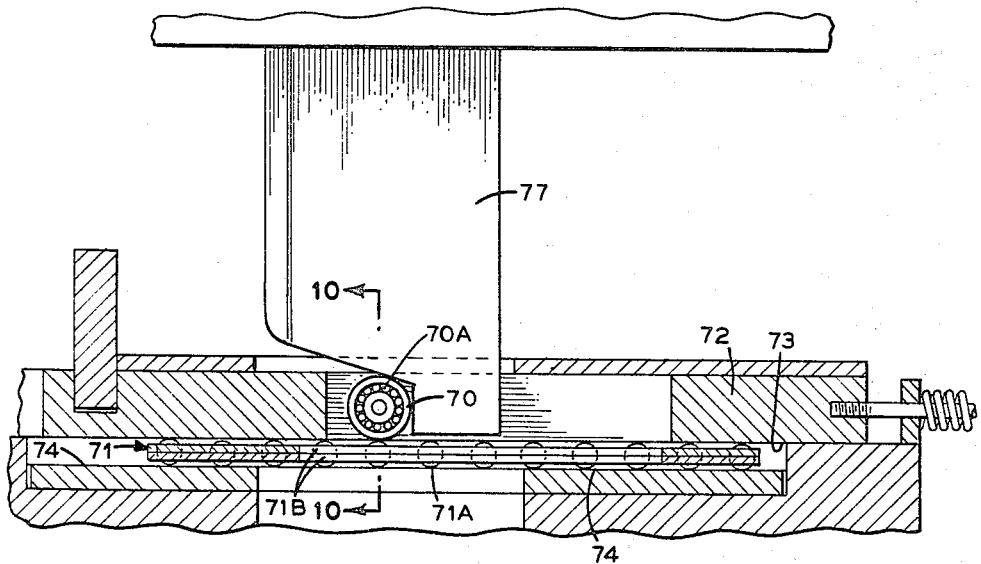
FIGURE 12 is a vertical elevation view of still another modified form of the invention and having parts thereof shown in section.
Figure 13:
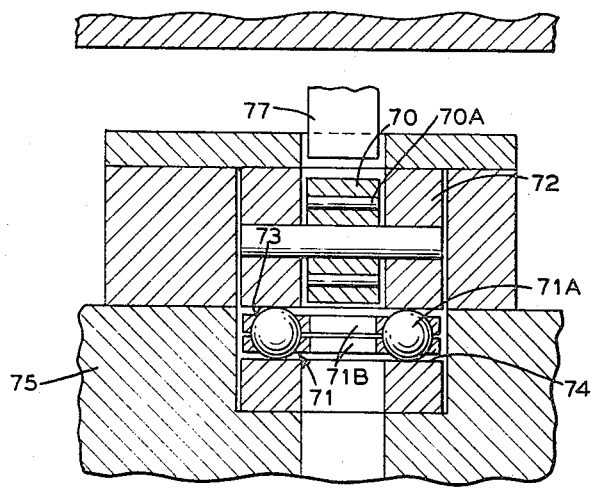
FIGURE 13 is a section view taken along line 10—10 on FIG. 10.

Referring to the drawings, there is shown in FIGS. 1 and 2 a fin construction 15 which is utilized as a radiation surface in a heating and/or cooling unit. As shown, the fin 15 of FIGS. 1 and 2 is formed of relatively thin gauge sheet material, such as aluminum, copper or the like and it is defined as a co-planar surface 16 which is substantially rectangular in form and which is provided with a central opening 17. A laterally extending collar or flange 18 circumscribes the opening. A fin 15 of this type is utilized as a radiation surface in a baseboard or hot water type of radiation unit. A tubular member or pipe T, through which the heating fluid flows, is extended through the aligned openings 17 of a series of radiation fins spaced therealong. Normally, the fins 15 are secured to the tubular member T by expanding the tubular member T to the collar opening 17 of the respective fins. If desired, the width of the collar may determine the spacing between adjacent fins 15.

It has been customary to form such fin constructions by feeding a continuous strip or blank of stock material through a pair of progressive drawing dies of a die press. Generally, the progressive dies are provided with a number of progressive forming stations wherein the stock material is progressively formed by a series of drawing and piercing operations from blank sheet material to the finished fin. If desired, a plurality of fins may be simultaneously formed in side by side relationship from a single width of continuous sheet or ribbon of stock material. In the illustrated form of the invention, the die is constructed to accommodate a material width from which three rows of fins can be simultaneously formed. However, depending on the width of the stock material utilized, one or more rows of fins may be continuously formed.

The instant invention is directed to an improved die and feeder system 20 in which a continuous sheet of blank material 21 may be precisely fed equal predetermined amounts through the die set of a given press. FIGS. 3 to 5, illustrates one embodiment of the present invention. In FIG. 3 the components of the die system 20 are illustrated in the position they will normally assume when the crank shaft of the die press is located at the top dead-center position. The arrangement is such that the feed motion of the die feed system 20 is derived from the downward movement of the ram of the die press, which is not shown. The up movement of the ram (not shown) accordingly resets the pull through feed system 20 for the next succeeding stroke.

In accordance with this invention, the forming dies of the press are carried on a pair of complementary die plates 22, 23. The dies are provided with a series of progressive die forming stations, e.g. one or more drawing stations, piercing stations, etc. One die plate 23 is fixed in a suitable manner on the bed of the press. The movable complementary die plate 22 is suitably connected to the ram of the die press for movement toward and away from the fixed die plate.

In accordance with this invention an actuator 24 is suitably connected to the movable die plate 22 by means of a bracing bar 25 to move with the movable die toward and away from the fixed die. As shown, the actuator 24 includes a member having an inclined or angularly disposed cam surface 26 and a vertical cam surface 27. If desired, the length of the inclined cam surface 26 may be extended by connecting one or more extension members 28 with a complementary cam surface 28A to the vertical cam edge 26A of the actuator 24. By means of spacing shims 29 interposed between the main cam actuator 24 and the actuator extension 28 thereof, the length of the inclined cam surface 26, 28A may be varied according to increase or decrease the stock feed with respect to the die stroke of the press.

Slidably mounted along at least one side of the fixed die 23 is a feeder drive bar 30. As best seen in FIGS. 4 and 5, the feeder drive bar 30 is mounted for rectilinear movement on the bottom die plate 23 between inner and outer feed bar guide members 31, 32. A retainer plate 33 connected to and extending between the inner and outer feed bar guide members 31, 32 serves to encase or house the feed drive bar 30 for precise rectilinear movement.

As shown in FIG. 3, both the retainer plate 33 and the feed drive bar 30 are each provided with aligned slotted openings 33A and 30A respectively. The arrangement is such that the slotted openings 33A and 30A of the retainer plate 33 and the feeder drive bar 30, respectively, are disposed in alignment with the cam actuator 24.

In accordance with this invention a cam follower means adapted to be cammed by the cam actuator 24 is operatively associated with the feed drive bar 30. In the illustrated form of the invention, the cam follower comprises a cam roller 34 which is rotatably journalled in the slotted opening 30A of the feeder drive bar 30 by a pin or axle 35. Accordingly, it will be noted that as the movable die plate 22 is moved toward operative position to the fixed die plate 23, the cam actuator 24 secured thereto is likewise displaced downwardly to bring the inclined surface 26 thereof into camming engagement with the cam follower or roller 34. As the cam actuator 24 engages the roller 34 the drive bar 30 connected thereto is displaced a corresponding amount in a horizontal direction.

To maintain the inclined surface 26 of the cam actuator 24 and the cam follower 34 in positive camming engagement, a means is provided for normally biasing the feed drive bar 30 and associated cam follower 34 in a direction opposite to the direction of feed. This is attained by extending a rod or shaft 36 to the rear of the drive bar 30. As shown, the shaft 36 is suitably connected at one end to the drive bar 30 and has its other end extended through an opening in a back-up plate 37 secured to the press. Connected to the extended end of the rod 36 is a spring stop 38. A compression spring 39 is interposed about the rod 36 so as to extend between the spring stop 38 and the back up plate 37. Accordingly, the spring 39 normally urges the feed drive bar 30 in a direction opposite to that in which the actuator 24 will drive the feed bar 30 upon actuation of the press. In this manner the spring 39 maintains a positive bias on the feed bar 30 to maintain the roller or cam follower 34 against the inclined cam surface 26 of the actuator 24.

Connected to one end of the feeder drive bar 30 is a pull means 40. The pull means 40 is to engage the material 21 to pull the material 21 along therewith as the feed bar 30 is advanced or cammed to the left (as viewed in FIG. 3) by the cam actuator 24 on the downward movement or closing stroke of the die plates 22, 23.

Referring to FIGS. 4 and 5, the pull means 40 comprises a carrier bar 41 which is attached at one end to the feeder bar 30. In the illustrated embodiment the attachment is effected by a spring hinge assembly. The hinge assembly comprises a pin 42 which pivotally connects the carrier bar 41 to the end of the feeder bar 30, and a spring 43 is interposed between the carrier bar 41 and its support 44 to exert a bias on the carrier bar 41 tending to urge the same in a counterclockwise direction about the hinge pin 42. As shown in FIGS. 3 to 5 the carrier bar 41 is defined as an L-shaped member wherein the leg 41A of the L is pivotally connected to the end of the feed bar. The other leg portion 41B of the carrier is spaced above the fixed die plate 23. The leg 41B of the carrier bar 41 spaced above the die plate is provided with a bore 44 in which a feeding finger 45 is slidably disposed. As shown, the bore 44 is provided with an elongated slot 44A to accommodate a guide pin 46 which extends from the stem of the feed finger. Accordingly, the feeding finger 45 is free to be vertically displaced within the bore 44 of the carrier bar 41. Also, the slot 44A and guide pin 46 connection functions to prohibit rotation of the feeding finger 45 within the bore 44 of the carrier bar.

The lower end of the feeding finger is provided with a flange portion 47 which has formed on the lower surface thereof a projection 48 which is adapted to be received in the collared opening 21A formed in the stock material 21 at a preceding forming station. As shown, the projection 48, adapted to engage the collared openings 21A formed in the stock material, is tapered at 49 upwardly in the rearwardly direction. This construction allows the feeding finger 45 to be cammed out of the collared opening 21A upon the return stroke of the feeder drive bar 30. The feeding finger 45 slidably disposed in bore 44 is normally loaded in a downward direction by means of a feeding finger spring 50 which is mounted on the top of the carrier bar 41. Accordingly, the spring 50 is defined as a leaf spring which is anchored at one end by a suitable pin or bolt 51 and has its free end spring loading the upper end of the feeding finger 45.

Disposed adjacent to the end of the fixed die plate is a feed plate 52 which has formed therein a series of elongated openings 53. Normally, the elongated openings 53 of the feed plate 52 are disposed in alignment with the feeding finger. In the illustrated embodiment only one finger 45 is shown, however, one or more fingers may be provided depending on the width of the stock to be fed. Disposed in each of the respective slotted openings 52 is a material lift spring 54 which operates on the stock material 21 being pulled through the die. Spring 54 functions to bias the material 21 upwardly to insure that the feeding finger 45 will remain engaged with the material 21 to the very end of the feed stroke.

In accordance with this invention, a material brake means 55 is disposed adjacent the lead-in end to the dies. The material brake 55 comprises a fixed braking member 56 and a movable braking member 57. The movable brake member 57 is spring loaded toward the fixed member 56 by means of a compression spring 58 so that a predetermined force or holding tension is constantly maintained on the material being fed between the brake members 56, 57. Accordingly, the brake 55 acts directly on the material. The brake 55 thus functions as a means which will insure that only the amount of material corresponding precisely with the rectilinear displacement of the feeder drive bar 30 will enter between the forming dies. This insures perfect registration of the material from station to station in the progressive die.

In operation the material 21 to be formed may be taken from a suitable source of supply, as for example, a coiled or continuous roll of stock material in which the free end of the stock material is threaded between the complementary braking members 56, 57 and into the space between the forming dies. The material is then advanced through the dies to the point that the feeding finger 45 engages one of the collared holes 21A formed in the material. Accordingly, on each stroke of the press, the rectilinear displacement of the feeder drive bar 30 is effected each time the movable die plate 22 closes onto the fixed plate 23 to form the materials therebetween. In doing so, the feeder finger 45 which is disposed in engagement with the collared opening 21A will pull the material through the dies an amount corresponding precisely to the rectilinear displacement of the feeder drive bar. Accordingly, the feed is accomplished as the dies close and prior to the dwell thereof. On the upstroke of the ram and the die plate connected thereto, the compression spring 39 acting on the feeder drive bar 30 will cause the same to return to its normal inoperative position. In doing so, the rearwardly inclined surface 49 of the spring finger 45 will cam the spring finger 45 free of its engagement with the collared hole 21A to automatically disengage the finger 45 from the collared opening. The drive bar and feed finger is then reset to the next preceding collared opening, at the end of the return stroke of the drive feed bar. At this point, the parts are in position to repeat the operating cycle of feeding and forming the material in the die set. The arrangement is such that the brake means 55 acting on the material will insure precise advancement of only that amount of material to the die space corresponding to the rectilinear displacement of the feeder drive bar. Thus the feed of the material through the die is rendered entirely dependent upon the stoke of the die plate 22 and is not tied or limited in any way to the crank shaft of the press. The precise movement by which the stock material 21 is moved through the respective forming stations of the dies in accordance with this invention insures positive registration of the material from station to station.

FIGS. 8, 9 and 10 illustrate a modified form of the invention. In this form of the invention, the structure of the die plating and the pull through feeder system therefor is substantially similar to that hereinbefore described with the exception that a bridge type finger carrier 60 is utilized instead of the cantilever or hinged carrier 41 as described with respect to FIGS. 3 through 5. The bridge carrier 60 is in this form of the invention more rigid, and it has application on presses capable of handling varying stock widths. Accordingly, the bridge type of carrier bar 60 is preferred when stock material of substantial widths are being run through the die set. Accordingly, the bridge carrier 60 can easily accommodate stock widths of 26 inches or more.

In this form of the invention the cam actuator 61 and associated feed bar 62, similar to that herein described with respect to FIGS. 3 to 5, are placed on each side of the movable die plate 63. The feed finger carrying bar or bridge 60 is interconnected between ends of the spaced feed drive bars 62 which are slidably disposed along each side of the fixed die on die plate 64, as best seen in FIGS. 9 and 10. Accordingly, the co-action between the cam actuators 61 and associated feed bars 62 in this form of the invention is similar to that hereinbefore described, and therefore, need not be repeated.

As shown in FIGS. 9 and 10, the bridge type carrier bar 60 is defined as an inverted U-shaped member in which the opposed leg portions 60A are rigidly secured to the respective ends of the feeder drive bars 62 by a suitable bolt or stud 65. If desired, a precision ground adjusting shim 66 may be placed between the carrier bar 60 and the end of the feeder drive bar 62. In this embodiment the adjusting shim 66 takes the place of the shim 29 mounted between the cam actuator 24 and cam extension 28 described with reference to FIGS. 3 to 5. Accordingly, the shim 66 placement of FIGS. 9 and 10 simplifies the design of the cam actuator 61 to that as shown in FIG. 8, and thereby eliminates the possibility of a feeder drive bar jump as the feeder drive bar cam roller passes the discontinuity resulting in the inclined cam surface due to the shim slot as in the actuator 24 in FIGS. 3 to 5 when an extension is utilized.

Also, the utilization of the shim 66 between the carrier bar 60 and the end of the feed drive bar 62 as in FIGS. 9 and 10 provides for a simple and rapid means for effecting adjustment of the feed stroke.

The feeding finger carrying bar 60 is made to suit the stock width to be run through the die set and is designed to carry one or more feeding fingers 67. In the illustrated form of the invention of FIGS. 9 and 10, three fingers 67 are shown. The feeding fingers 67 are similar as described with respect to FIGS. 3 to 5 and consequently the function is the same manner. It will be noted that the fingers 67 have an arcuate leading edge traversing approximately 150° of a circle. In this manner elongation of the hole 21A during a feed is prohibited.

Referring to FIG. 11, the physical positioning of the feeding fingers for both the stock move, and after the stock move is illustrated. In FIG. 1 there is shown the strip of material 21 as it is fed over the fixed die. The arrangement is such that three run-out stations may be provided beyond the last forming station of the die. Accordingly, the stock feed takes place between the second and third run-out station E and F. At station E, the feed finger is disposed in the respective stock holes 21A, but located approximately .050" behind the true hole position to allow for free drop in of the feed finger 45 or 67 as it drops back after the feed. In the ready feed position (position E), the cam or actuator 24 or 61 is disposed in its full up position as shown in either FIGS. 3 or 8. As the cam actuators are moved downwardly by the ram of the press, the feeder bar cam roller 34 or 68 is forced to move horizontally as it follows the curvature or incline cam actuator. After the associated feeder drive bar has moved forward .050", the arcuate edge of feeding finger makes contact with a corresponding edge of the collared hole in the stock. With the cam actuator continuing downwardly, the stock 21 is pulled or advanced through the die and the associated brake 55.

Referring to FIGURE 8, when the horizontal centerline D of the feeder drive bar cam roll 64 reaches position D1, the exact point of tangency between the vertical portion 61A of the cam actuator 61 and the circumference of the circle formed by radius R2, part of the cam profile, the feeder drive bar 62 stops its forward motion and the feeding fingers 67 in the feed bridge come to rest. When this occurs, the fingers 67 have moved the stock 21A from run-out station E to F. In this move, the stock holes 21A are finally positioned three station distance (3×) from the last station in the die. Thus mechanical position of the feeding fingers 67 is exactly controlled by the dis tance from the vertical face 61A of the cam actuator above, D1, FIG. 9, and the exact center of the feed finger 67 at position F, or at full feed with the cam actuator 61 at the down position where the cam roll centerline D is above D1. Accordingly, the feed fingers 67 are positioned exactly by increasing or decreasing the thickness of shims 66. Measurements can thus be made by a micrometer using the face of the slotted feed plate as a reference.

As the cam actuator, e.g. 61, rises after the bottom of the present stroke is reached, the associated feeder bars 62 start to retract as soon as D passes D1. The feed fingers 45 or 67 move back out of the holes 21A at the third run off station. As the feeder bars 62 continue to retract, the fingers 45 or 67 will drag back over the stock 21 and drop into the holes 21A at the second run off sta tion and comes to rest .050″ behind the stock hole center 21A. At this point the cam roll 68 reaches the bottom vertical extension 61B of the actuating cam. This position is reached at the exact top of the press stroke.

Radius R1 of the cam actuator 61 is about .050″ greater than the radius of the cam roll 68 to reduce acceleration shocks as the feed bar is accelerated in the forward direc tion by the cam. Radius R2 is from .125″ to .250″ to pro vide roll off and to eliminate cam feed bar jump as the feed bar accelerates at the end of the feed move. In the de scribed embodiment, run out stations E and F were se lected for pick up and final feed, but it will be understood that any two run out stations may be used.

FIGURES 10 and 11 illustrate still another embodi ment of the invention. This form of the invention is con structed and arranged to enhance or increase the feed stroke without increasing the die stroke. Normally, high speed presses to which the instant invention relates have a stroke in the range from 2″ to 2¼″. About 20% of the press stroke is required for the dwell during which the material 21 is being formed by the die members. Accord ingly, the available stroke for feeding the material to the forming station is about 1.6″ to 1.8″.

For translation cams or actuators of the type described with reference to FIGS. 3 to 5 and 8 to 10, the feed incre ment in inches, in terms of stroke increment in inches, is equal to the stroke increment in inches divided by the natural tangent of the cam angle, i.e. (the angle between the axis of the feed drive bar of FIGS. 3 to 5 and 8 to 10, and the incline face of the cam). For a usable stroke of 1.6″ and a cam angle of 45°, the feed bar travel is 1.6″ with a 1.6″ of feed of the stock. With a 30° cam angle and a 1.6″ available usable stroke, a feed of 1.6″ divided by .577″ will produce 2.77″. However, it will be noted that the cam angle cannot be reduced as desired to pro duce the longer feed stroke while using the feed drive bar 30 or 62 of the type described with respect to FIGS. 3 to 5 and 8 to 10 respectively. As described in the embodi ments of FIGS. 3 to 5 and 8 to 10, the feed bar drive bar is housed alongside the fixed die plate by means of the inner and outer guide members and the retainer plate, and it derives its motion from the forces imparted to the cam follower roller 34 or 68 by the downward movement of the actuator cam. However, due to the angle or incline of the cam, the forces acting on the cam roller 34 or 68 has a horizontal component and a vertical component. The horizontal component effects the drive of the associ ated drive bar, whereas the vertical component produces the friction resisting the forces between the feed bar and its support, the bottom die plate. Thus when the cam angle is reduced to such a value that the natural tangent of the angle equals the coefficient of the friction between the drive bar and its support, the fixed die plate; the sys tem will lock and the feed bar will not move. Thus the press forces will shear the cam roller shaft.

Assuming a limiting value of about .3 for the co efficient of friction, the limiting cam angle would equal approximately 17°, and assumes zero friction between the cam roller and its shaft. However, at the low cam angles, this frictional resistance is considerable. For this reason the limiting cam angle for reliable operation is increased to about 26° (natural tangent .487″). This limits the feed of the system to 1.6÷.487″ or about 3.3″.

To obtain longer feeds, it becomes necessary to reduce the friction in the cam roller and in the associated drive bar system. This is accomplished, in the embodiment of FIGS. 10 and 11 by utilizing an anti-friction cam roller 70 with roller bearings 70A, and an anti-friction bearing assembly 71 for supporting the drive feed bar 72. As shown, a linear bearing 71 includes a plurality of ball bearings 71A and retainer 71B which has its top race defined by the hardened under side 73 of the drive bar 72, and the bottom race is defined by the hardened flat plate 74, which sets onto the fixed die member 75. Races 73 and 74 are shown flat, but either one or both may be grooved to increase the load capacities. With this anti friction system, the co-efficient of friction drops to about .05 or roughly ⅙ of the feed bar bearing shown with re spect to FIGS. 3 to 5 and 8 to 10. Theoretically, this value would allow a cam angle of 3° and still obtain the cam drive. However, the drive bar must be spring loaded to re turn the bar to the initial feed position after the feed. The spring forces resolve into vertical and horizontal com ponents, and adds to the cam roll load. The limiting con ditions in the system is thus the shear load on the cam roller.

Accordingly, a limiting cam angle of about 15° is prac tical and this allows a feed of 1.6″ divided by .267″ or 6″ in a press having a usable stroke of 1.6″. The maximum possible cam angle is used to give the desired move, there by reducing the stresses in the system and giving long service life with minimum wear.

In all other respects the invention as described with re spect to FIGS. 10 and 11, the structure and operation, is similar to that hereinbefore described and need not be re peated for an understanding thereof. As shown in FIG. 12, the actuator 77 is similar to that of FIG. 3 except that the angle of the incline may be less.

From the foregoing, it will be noted that the feeder of this invention can be built into the die structure and ac tuated by the die stroke. Accordingly, linkages to the crank shaft of the press are not required. For this reason the feed accuracy is exact to the feed setting and the accu mulative run out tolerance is always constant. In each of the embodiments, the feed is actuated by the simple up and down movement of the cam actuator and the feed drive is effected by a simple rectilinear camming action. Accordingly, the arrangement is such that the feed can be set by a precision micrometer from reference points built into the die. Hardened feeder parts maintained to feed accuracy of the system over a considerable period of operation. Also the feeder system described is adapted for use on stock material of varying widths. The arrange ment is such that it is rendered virtually impossible to jam the feeder and consequently, press protection is not re quired.

While the instant invention has been described with re spect to several variations thereof, other variations and modifications may be made without departing from the spirit or scope of the invention.

What is claimed is:

1. In combination with a drawing die set having a forming station including a fixed die means and a com plementary reciprocating, movable die means mounted for movement toward and away from said fixed die means, the improvement of a pull-through feeder system for progressively advancing the material to be formed through said die set so that the material is precisely advanced in near-perfect registry to the forming station, said feeder system including,
(a) a feeder means including a feeder bar mounted for rectilinear reciprocal movement along said fixed die means,
(b) a cam follower connected to said bar,
(c) an actuator operatively connected with said movable die means,
(d) said actuator including a cam having an inclined surface engaging said cam follower of said feeder bar as said movable die means is moved toward said fixed die means to effect a predetermined rectilinear displacement of said feeder bar,
(e) pull means connected to said feeder bar to engage said material to pull said material through said die set,
(f) said pull means being disposed beyond the forming station of said die means,
(g) and means for exerting a holding force to resist the pull on said material so as to insure that only that amount of material will enter between the die means corresponding precisely to the rectilinear displacement of said feeder means and pull means connected thereto.

2. The invention as defined in claim 1 wherein said pull means includes:
(a) a carrier bar connected to said feeder bar,
(b) said carrier bar having an arm positioned to extend over said material in spaced relationship thereto,
(c) a feeding finger movably mounted on said arm,
(d) said feeding finger having an end portion arranged to engage a hole formed in the material to pull said material through said die set an amount substantially equal to the rectilinear displacement of said feeder bar,
(e) said end portion of said finger being back-tapered to allow disengagement of said finger from said material on the return stroke of said feeder bar, and
(f) resilient means acting on said finger for normally biasing the same toward said material.

3. The invention as defined in claim 1, and including means for normally biasing said feeder means toward inoperative position to maintain said cam means and cam follower in positive engagement.

4. A drawing die set having a plurality of progressive forming stations comprising,
(a) fixed die means,
(b) a complementary reciprocating movable die means mounted for movement toward and away from said fixed die plate,
(c) a pull through feeder system for progressively advancing the material to be formed from station to station so that the forming taking place at any given station will be in near perfect registry with any forming in any preceding station,
(d) said feeder system including a feeder drive means mounted for rectilinear movement along said fixed die means,
(e) an actuator operatively connected with said movable die means to engage said feeder drive means as said movable die means is moved toward said fixed die means,
(f) a follower connected to said feeder drive means and engageable with said actuator to effect a predetermined rectilinear displacement of said feeder drive means as said movable die means closes on said fixed die means,
(g) pull means connected to said feeder drive means to engage said material to pull said material through said die set, said pull means being disposed beyond said die means,
(h) and a brake means disposed in advance of said die means acting on said material to insure that only that amount of material corresponding to precisely the rectilinear displacement of said feeder drive means will enter between said die means so that the forming occurring in the respective stations are in proper registration.

5. In a draw press having a die set comprised of a fixed die means and a complementary relative movable die means for progressively forming a sheet material disposed therebetween accordingly, the improvement of,
(a) a pull through feeder system for progressively advancing said sheet of material through said die set on each stroke of said press,
(b) said system including a feeder drive means movably mounted along said fixed die plate,
(c) a cam means rigidly connected to said movable die means to move therewith on each stroke of the press,
(d) a cam follower operatively connected to said feeder drive means,
(e) said cam means and cam follower being operatively associated to effect rectilinear movement of said feeder drive means on each stroke of said press,
(f) and means carried by said feeder drive means and disposed beyond said die means to pull said sheet material through said die set a precise amount corresponding to the rectilinear movement of said feeder drive means,
(g) and a braking means disposed in advance of said die means for operating on said material whereby said braking means allows only that amount of material to enter the die set as determined by the rectilinear advancement of said feeder means and connected pull means carried thereby.

6. In combination with a set of drawing dies having a plurality of progressive forming stations and including a fixed die plate and a complementary reciprocating movable die plate mounted for movement toward and away from said mixed die plate, the improvement of a pull through feeder system for progressively advancing the material to be formed from station to station of said die set so that the forming taking place at any station is in registry with any forming in any preceding station, said feeder means including,
(a) a feeder drive bar having an elongated slot formed therein, said feeder bar being mounted for rectilinear movement along said fixed die plate,
(b) a cam roller rotatably journalled in said slot to said bar,
(c) a cam connected to said movable die plate, said cam being disposed in alignment with said slot, and said cam having an inclined surface disposed in rolling engagement with said roller,
(d) means connected to said feeder drive bar maintaining said cam and cam roller in positive rolling engagement, said feeder drive bar being rectilinearly displaced when said cam is actuated,
(e) a material pull means adapted to engage the material after it has been formed by the die means, said pull means being connected to said feeder drive bar,
(f) said material pull means including a carrier bar connected to said feeder drive bar to move therewith,
(g) said carrier bar having an arm position extending over said material in spaced relationship thereto,
(h) a feeding finger movably mounted on said arm,
(i) said feeding finger having an end portion arranged to engage a hole formed in said material to pull said material through said die set an amount substantially equal to the rectilinear displacement of said feeder drive bar,
(j) said end portion of said finger being back tapered to allow disengagement of said finger from said material on the return stroke of said feeder drive bar,
(k) and a brake means disposed in advance of said die means for applying a constant force on said material to effect a holding force on said material so that only that amount of material enters the drawing dies corresponding to the rectilinear movement of said feeder drive bar to insure registration of the material from station to station.

7. A set of drawing dies having a plurality of progressive forming stations comprising,
   (a) a fixed die plate,
   (b) a complementary reciprocating movable die plate mounted for movement toward and away from said mixed die plate,
   (c) a pull through feeder means for progressively advancing the material to be formed from station to station of said die set so that the forming taking place at any one station is in registry with any forming occurring in any preceding station,
   (d) said feeder means including a feeder drive bar having an elongated slot formed therein, said feeder bar being mounted for rectilinear movement along said fixed die plate,
   (e) a cam roller rotatably journalled in said slot to said bar,
   (f) a cam connected to said movable die plate, said cam being disposed in alignment with said slot,
   (g) said cam having an inclined surface disposed in rolling engagement with said roller,
   (h) means connected to said feeder drive bar normally biasing the cam roller to said feeder drive against said cam to positively urge said roller in rolling engagement with said cam,
   (i) a material pull means adapted to engage the material to be formed connected to said feeder drive bar,
   (j) said material pull means including a carrier bar connected to said feeder drive bar,
   (k) said carrier bar having an arm position extending over said material in spaced relationship thereto,
   (l) a feeding finger movably mounted on said arm,
   (m) said feeding finger having an end portion arranged to engage a hole formed in said material to pull said material through said die set an amount substantially equal to the rectilinear displacement of said feeder drive bar,
   (n) said end portion of said finger being back tapered to allow disengagement of said finger from said material on the return stroke of said feeder drive bar,
   (o) resilient means acting on said finger for normally biasing the same toward said material,
   (p) and a brake means for applying a constant force on said material to effect a holding force on said material to insure registry of the material from station to station of said die.

8. The invention as defined in claim 7 and including means for enhancing the rectilinear displacement of said feeder drive bar in proportion to the stroke of said movable die plate.

9. The invention as defined in claim 8 wherein said latter means includes ball bearing means interposed between said feeder drive bar and said fixed die plate to minimize resistance therebetween.

10. The invention at defined in claim 9 wherein said cam roller connected to said feeder drive bar includes an antifriction means.

11. The invention as defined in claim 7 wherein said carrier bar is hingedly mounted at one end thereof to said feed drive bar.

12. The invention as defined in claim 7 wherein said carrier bar comprises a bridge fixed at each end to said feed drive bars.

13. A die set comprising of,
   (a) a fixed die plate,
   (b) a complementary movable die plate,
   (c) a pull through feeder system for progressively advancing said sheet of material through said die set on each actuation thereof,
   (d) said system including a feeder drive means movably mounted along said fixed die plate,
   (e) a cam means rigidly connected to said movable die plate to move therewith toward said fixed die plate,
   (f) a cam follower operatively connected to said feeder drive means,
   (g) said cam means and cam follower being operatively associated to effect rectilinear movement of said feeder drive means as said movable die plate moves toward said fixed die plate, and
   (h) means rendering said feed increment of said feed drive means greater than the stroke increment of said movable die plate toward said fixed die plate,
   (i) pull means connected to said feeder drive means, and disposed downstream of said die means,
   (j) said pull means being operative to engage said material to pull the same through said die set as said feeder drive means is rectilinearly advanced, after said material has been formed,
   (k) and a braking means operating on said material disposed upstream from said die means whereby said braking means allows only that amount of material to enter the die set corresponding feed increment of said feeder drive means and connected pull means.

14. The invention as defined in claim 13 wherein said means for enhancing the feed increment of said feed drive means comprises,
   (a) a cam means having an inclined surface angled at less than 45° with respect to the horizontal,
   (b) means for minimizing friction in the cam follower and feed drive means.

15. The invention as defined in claim 14 wherein said latter means includes anti-friction ball bearing means interposed between said feeder drive means and said fixed die plate to minimize resistance therebetween.

16. The invention as defined in claim 15 and including an anti-friction means in said cam roller.

17. A set of forming dies comprising,
   (a) a fixed die plate,
   (b) a complementary reciprocating movable die plate mounted for movement toward and away from said fixed die plate,
   (c) a pull-through feeder means for progressively advancing the material to be formed from station to station of said die set so that the forming, taking place at any one station is in registry with any forming occurring in other preceding station,
   (d) said feeder means including a feed drive bar mounted for rectilinear movement along said fixed die plate,
   (e) a cam roller rotatably journalled to said bar,
   (f) a cam connected to said movable die plate,
   (g) said cam having an inclined surface disposed in rolling engagement with said roller,
   (h) means connected to said feeder drive bar normally biasing the cam roller to said feeder drive against said cam to positively urge said roller in rolling engagement with said cam,
   (i) a material pull means adapted to engage the material to be formed connected to said feeder drive bar,
   (j) said material pull means including a carrier bar connected to said feeder drive bar,
   (k) said carrier bar having an arm extending over said material in spaced relationship thereto,
   (l) said feeding finger movably mounted on said arm,
   (m) said feeding finger having an end portion arranged to engage a hole formed in said material to pull said material through said die set an amount substantially equal to the rectilinear displacement of said feeder drive bar,
   (n) said end portion of said finger being back-tapered to allow disengagement of said finger from said material on the return stroke of said feeder drive bar,
   (o) resilient means acting on said finger for normally biasing the same toward said material, (p) and brake means for applying a constant force on said material to effect a holding force on said material to insure registry of the material from station to station of said die.

References Cited

UNITED STATES PATENTS

| | | | |
|---|---|---|---|
| 674,852 | 5/1901 | Coe | 72—421 |
| 1,626,977 | 5/1927 | Sibley | 72—361 |
| 2,873,448 | 2/1959 | Berg | 72—428 |
| 2,944,499 | 7/1960 | Schaufelberger | 72—361 |
| 3,138,128 | 6/1964 | Suofy | 113—113 |

RICHARD J. HERBST, *Primary Examiner.*

U.S. Cl. X.R.

72—405, 421; 113—113